T. FOUTS.
ANIMAL FEEDER.
APPLICATION FILED FEB. 19, 1918.
1,321,614.
Patented Nov. 11, 1919.
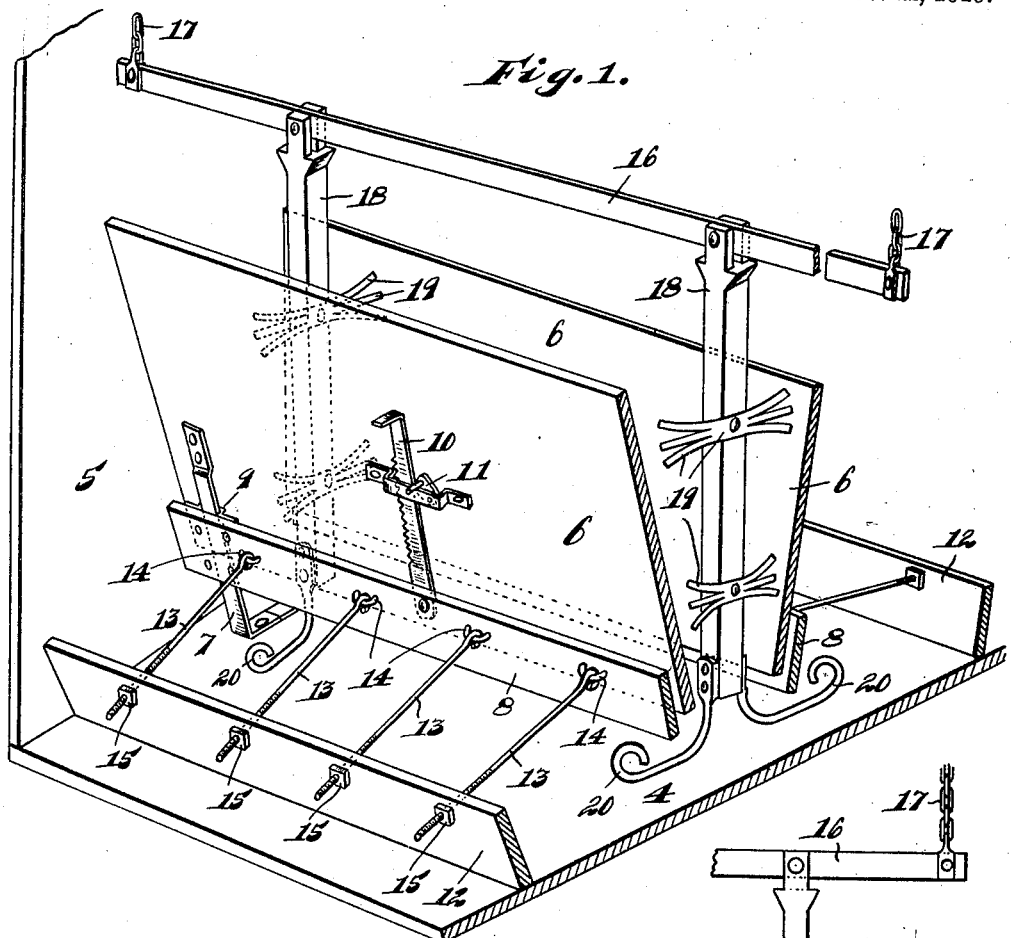
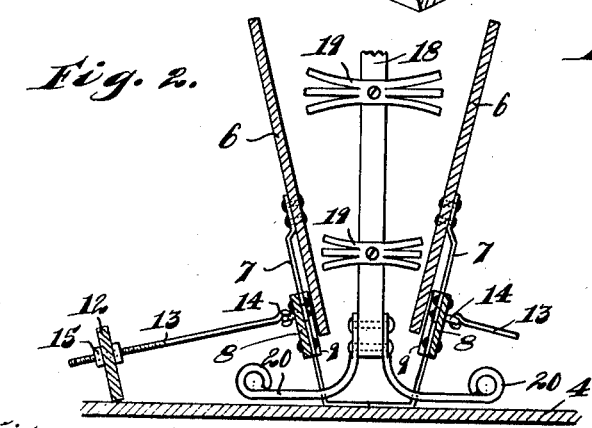
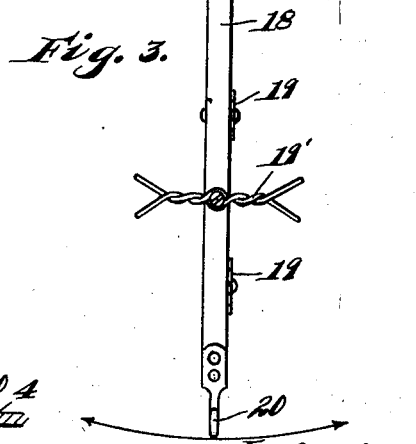
Witnesses:
C. E. Wessels.
B. G. Richards.
Inventor:
Taylor Fouts,
By Joshua R. H. Potts
his Attorney.

UNITED STATES PATENT OFFICE.

TAYLOR FOUTS, OF CAMDEN, INDIANA.

ANIMAL-FEEDER.

1,321,614.   Specification of Letters Patent.   Patented Nov. 11, 1919.

Application filed February 19, 1918. Serial No. 218,047.

*To all whom it may concern:*

Be it known that I, TAYLOR FOUTS, a citizen of the United States, and a resident of the city of Camden, county of Carroll, and State of Indiana, have invented certain new and useful Improvements in Animal-Feeders, of which the following is a specification.

My invention relates to improvements in animal feeders, and has for its object the provision of an improved construction of this character provided with improved agitating means for facilitating and inducing discharge of the feed.

The invention consists in the combinations and arrangements of parts hereinafter described and claimed.

The invention will be best understood by reference to the accompanying drawings forming a part of this specification, and in which, Figure 1 is a perspective view of a portion of an animal feeder shown cut transversely, embodying the invention, Fig. 2, a partial end view of the same, and Fig. 3, a detail view of a modified form of construction.

The preferred form of construction as illustrated in the drawings, comprises a base board or platform 4 provided with vertical end walls 5 having downwardly converging hopper or trough side boards 6 secured therebetween and arranged at a short distance above the base board 4, as indicated, said side boards 6 being preferably supported on substantially U-shaped brackets 7, secured to said base board. Each of the side boards 6 is provided with an extension board 8 having straps 9 slidable on the brackets 7. Each extension board 8 is carried by adjusting bars 10 vertically adjustable through latch members 11 and by means of which the space between the lower edges of the trough sides 6 and the base board 4 may be adjusted as desired. Additional trough side boards 12 are loosely arranged on the base board 4 and adjustably held in place by eye bolts 13 engaging staples 14 on boards 8 and having nuts 15 to facilitate adjustments. By this arrangement it will be observed that the feed space for the animals may be adjusted as desired, and also that the trough sides 12 may be readily raised or removed for cleaning purposes.

A suspending bar 16 is arranged centrally over and between the hopper sides 6 and suspended at both ends on chains 17. Agitator bars 18 are provided on the bar 16 and provided at intervals with suitable agitator prongs 19 for agitating the feed in hopper 6, to facilitate the feed thereof. Each of the agitator bars 18 at its lower end, is provided with laterally extending nose pieces 20 adapted to be operated by the noses or other parts of the animals feeding, whereby agitation of the feed in hopper 6 is effected to facilitate the feeding thereof and to prevent caking or clogging of the feed.

In the form of construction illustrated in Fig. 3, the agitator bars 18 are provided with slightly different forms of agitator prongs 19' arranged to extend longitudinally with reference to the hopper 6.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A feeder comprising a trough; a feed hopper discharging into said trough; a suspension bar arranged substantially centrally in said hopper and flexibly suspended at its ends; agitator members pivoted to said suspending bar; agitator prongs on said agitator members; and nose pieces on the lower ends of said agitator members and projecting into said trough, substantially as described.

2. A feeder comprising a base board; hopper sides positioned above said board with a space between the lower edges of said sides and said base board; a suspension bar arranged substantially centrally above and between said hopper sides and flexibly suspended at its ends; agitator members pivoted to said suspending bar; agitating prongs on said agitating members; and nose pieces on the lower ends of said agitating members and projecting outwardly through the spaces between the lower edges of said hopper sides and said base board, substantially as described.

In testimony whereof I have signed my name to this specification in the presence of two subscribing witnesses.

TAYLOR FOUTS.

Witnesses:
WALTER E. DAVIS,
L. A. TUCKER.

Copies of this patent may be obtained for five cents each, by addressing the "Commissioner of Patents, Washington, D. C."